United States Patent
McCracken et al.

(10) Patent No.: US 6,899,289 B2
(45) Date of Patent: May 31, 2005

(54) ATOMIZING NOZZLE FOR FINE SPRAY AND MISTING APPLICATIONS

(75) Inventors: Thomas W. McCracken, Glouster (CA); Adam J. Bennett, Ottowa (CA); Ronald J. R. Dignard, Chesterville (CA); Charles Poulin, Gloucester (CA)

(73) Assignee: National Research Council of Canada, Ottawa (CA)

(*) Notice: Subject to any disclaimer, the term of this patent is extended or adjusted under 35 U.S.C. 154(b) by 224 days.

(21) Appl. No.: 10/148,182
(22) PCT Filed: Dec. 5, 2000
(86) PCT No.: PCT/CA00/01457
§ 371 (c)(1), (2), (4) Date: Sep. 27, 2002
(87) PCT Pub. No.: WO01/41936
PCT Pub. Date: Jun. 14, 2001

(65) Prior Publication Data
US 2003/0080212 A1 May 1, 2003

Related U.S. Application Data
(60) Provisional application No. 60/168,770, filed on Dec. 6, 1999.

(51) Int. Cl.[7] ............................................. B05B 1/26
(52) U.S. Cl. ................... 239/461; 239/482; 239/490; 239/424; 239/427; 239/432; 239/434.5
(58) Field of Search .......................... 239/461, 476, 239/482, 486, 490, 518, 523, 419, 419.5, 424, 427, 432, 434.5, 433

(56) References Cited

U.S. PATENT DOCUMENTS

| | | | |
|---|---|---|---|
| 4,278,418 A | * | 7/1981 | Strenkert ..................... 431/8 |
| 4,483,482 A | | 11/1984 | Junger et al. |
| 4,728,036 A | | 3/1988 | Bennett et al. |
| 5,553,784 A | * | 9/1996 | Theurer ..................... 239/403 |
| 6,102,308 A | * | 8/2000 | Steingass et al. ......... 239/424.5 |

FOREIGN PATENT DOCUMENTS

| | | |
|---|---|---|
| CA | 951768 | 7/1974 |
| CA | 1051063 | 3/1979 |
| CA | 1209182 | 8/1986 |

* cited by examiner

Primary Examiner—Dinh Q. Nguyen
(74) Attorney, Agent, or Firm—Jones, Tullar & Cooper, PC

(57) ABSTRACT

The invention relates to a nozzle (10) for mixing a gaseous fluid such as air and a liquid such as water and for ejecting an atomized mist of liquid droplets. The nozzle includes a nozzle body defining first (60), second (44) and third (52) annular passages along the length thereof. Pressurized fluid is introduced into the first annular passage (60) and a first restricted annular orifice (68) leads from the first annular passage (60) to the third annular passage (52). Liquid is introduced into the second annular passage (44) and a second restricted annular orifice (48) leads from the second annular passage (44) to the third annular passage (52). Liquid and gaseous fluid are aggressively mixed in the third annular passage (52). A third restricted annular orifice (72) leads from the third annular passage (52) to atmosphere such that mixed liquid and gaseous fluid are forcibly ejected from the nozzle through the third restricted annular orifice (72), the liquid being atomized in small controlled droplets in the ejected gaseous fluid.

24 Claims, 3 Drawing Sheets

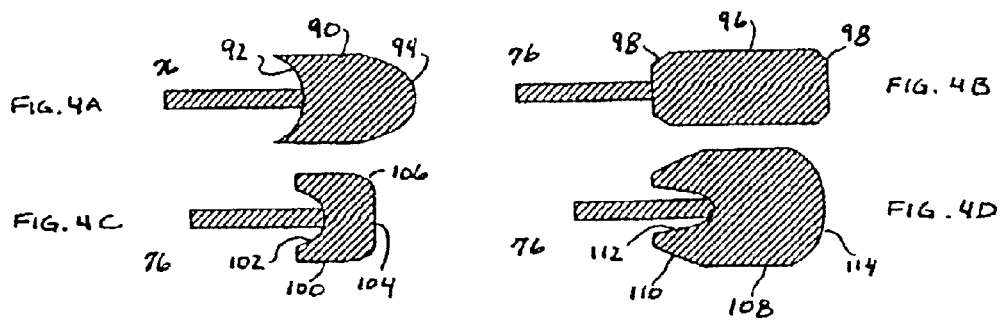
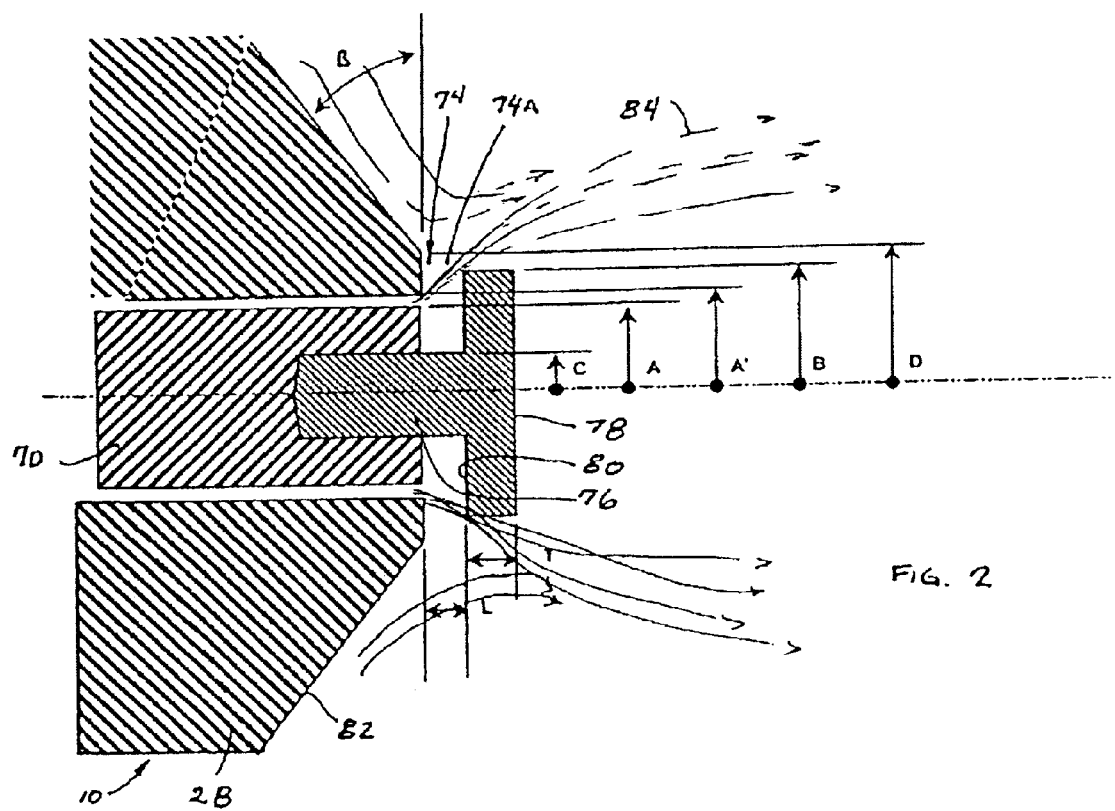

ATOMIZING NOZZLE FOR FINE SPRAY AND MISTING APPLICATIONS

This application claims the benefit of Provisional Application Ser No. 60/168,770 filed Dec. 6, 1999.

The present invention relates to a nozzle device for atomizing liquid for fine spray and misting applications. In particular the invention relates to a nozzle meeting criteria for air humidification in ducts used commercially in Heating Ventilating and Air Conditioning (HVAC) systems as well as in other humidification applications including localized spatial humidification for process and printing plant operations and greenhouse humidification.

BACKGROUND OF THE INVENTION

There are existing atomizer designs for the applications described above, the designs typically providing a spray that is dynamically controlled to vary air humidity level. Usually an array of nozzles is mounted within a duct or other area and the required humidification supply is varied by adjusting air and water pressures to suit the desired bulk vaporization rate. The existing nozzles suffer from a number of shortcomings, such as high air consumption, the collection of large droplets on external components of the assembly, relatively high cost, difficulty in providing a limited or controlled droplet size distribution, and high noise levels due to high air consumption.

Many current nozzle designs are configured Dr optimized for only one flow condition or the operating range is very limited for achieving consistent, unchanged droplet size. Also, many of the present designs that use air atomization are designed with one or more impactor plates that produce fine spray (typically less that 50 $\mu$m mean size) but the mounting for each plate interferes with the spray and often results in a fraction of the spray comprising course droplets resulting from an accumulation of liquid on the impactor-mounting components. Another problem associated with prior art nozzles, as indicated above, is the noise level produced by the nozzles since they are used in commercial building air conditioning. The high noise level of the prior art nozzles is usually attributed to high air consumption—thus a low air consumption is desirable.

U.S. Pat. No. 4,483,482 of Nov. 20, 1984 is representative of prior art designs. It utilizes a convergent/divergent tube-path to accelerate gaseous fluid into an annular mixing chamber where the fluid mixes with liquid entering downstream of the gaseous fluid inlet. The mixed fluid and liquid flow along an annular path towards the nozzle exit from which the fluid and liquid are sprayed in a fan-like pattern from the flared end of the nozzle. This nozzle suffers from all of the drawbacks enumerated hereinabove.

SUMMARY OF THE INVENTION

The present invention addresses the shortcomings associated with the prior art humidification nobles as discussed above. The present nozzle was designed so that it can be incorporated in new construction and so that it will work with existing lines of commercial products to replace older nozzle designs. To improve the humidification equipment, the present invention also involves refinement of supporting equipment for the spray system including: (a) controls for air and water flow for a distributed array of nozzles installed in ducting, with flow dumping for shutoff without duct contamination; (b) nozzle mounting support structures for installation in ducting; and (c) piping and feed-tubing header assemblies to supply air and water to the nozzles mounted in ducting.

The atomization device of this invention is unique in that the design incorporates a 2-phase flow conditioning chamber downstream of the mixing of gas and liquid phases. Air flow is limited by an orifice built into the nozzle body assembly, which orifice serves to limit air flow and deliver the air at near sonic conditions as it mixes with the liquid flow (i.e., in the 2-phase flow conditioning chamber). The nozzle uses 2-stage atomization: the $1^{st}$ stage provides for sonic flow through a chamber; and the $2^{nd}$ stage is in the cavity formed by a deflector disc or plate mounted at the nozzle exit. This design produces a spray droplet distribution which is bimodal and can have advantages in humidification for gradual evaporation of the water stream into a flow of air in HVAC duct applications. The nozzle of this invention can be connected to a dynamic feed control system for operating the nozzle over a range of conditions suited to the desired delivery rate of liquid for the nozzle (i.e., the humidification rate) without significant change in the spray shape and droplet size. Typically the mass-mean of the bimodal distribution of droplet sizes can be maintained in the range of 10 to 15 $\mu$m with a flow turndown ratio of 3 or greater.

The nozzle of this invention uses less than half the air consumption for equivalent spray performance in comparison to existing atomizers typically used in HVAC applications.

Water flow in typical nozzles used for HVAC applications is regulated by an adjustable needle (or other type). The new design uses a fixed orifice to meter the flow.

The nozzle of this invention uses an optional impact surface held by a center supporting rod. Such a design is not typically used for nozzles that have a two phase (water and air) flow.

The supporting mechanism for the center pin used in this invention is unique in nozzles used for humidification.

The atomizer or nozzle of this invention achieves a narrow and controlled droplet size distribution with low air consumption and fine atomization without dripping. The reduction of air consumption is very advantageous in some applications where limits are placed on the size of compressor that can be used in the installation.

In summary, the present invention may be considered as providing a nozzle for mixing a gaseous fluid and a liquid and for ejecting an atomized mist of liquid droplets comprising: a nozzle body defining first, second, and third annular passages along the length thereof; means for introducing pressurized gaseous fluid into the first annular passage; means defining a first restricted annular orifice leading from the first annular passage to the third annular passage; means for introducing pressurized liquid into the second annular passage; a second restricted annular orifice leading from the second annular passage to the third annular passage, whereby liquid and gaseous fluid are aggressively mixed in the third annular passage; and a third restricted annular orifice leading from the third annular passage to atmosphere, whereby mixed liquid and gaseous fluid are forcibly ejected from the nozzle through the third restricted annular orifice, the liquid being atomized in small controlled droplets in the ejected gaseous fluid.

BRIEF DESCRIPTION OF THE DRAWINGS

FIG. 2 shows an enlarged cross-sectional view of the outlet end of the nozzle, illustrating preferred dimensional relationships

FIGS. 4A to 4D shows cross-sectional views of several alternative shapes for the deflector plate of this invention.

DESCRIPTION OF THE PREFERRED EMBODIMENT

Figure 1:
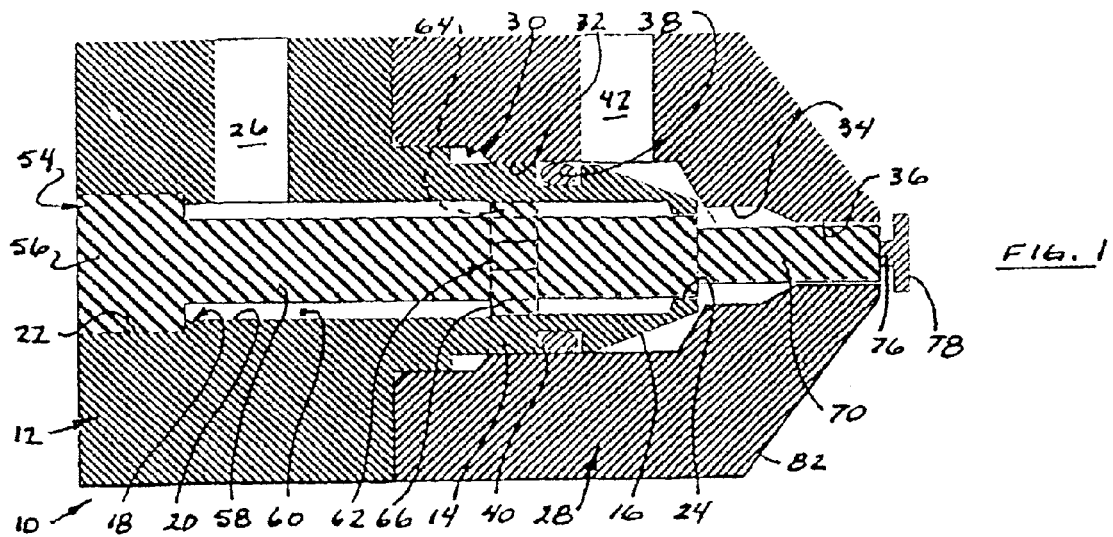
FIG. 1 shows a cross-sectional view of a nozzle constructed in accordance with the present invention.

The present invention provides a nozzle 10 which includes a main nozzle body 12, which body may be of any suitable external cross-section, such as cylindrical, rectangular, or square, for example, depending on the particular application in which it will be used. The main body has a rearmost block portion and is stepped down at the forward end to create a cylindrical projection 14 that has a frustoconical end surface 16. A central bore 18 extends through the main body, the bore being stepped as well so as to define a main central section 20, a proximal section 22 of a diameter greater than that of the central section, and a short distal section 24 of a diameter smaller than that of the central section. The distal section 24 and a portion of the central section 20 reside within the projection 14. A radially directed inlet port or bore 26 extending through the main body communicates the bore 18 at the central section 20 with a source of pressurized air (not shown).

The main body 12 mounts thereon a body cap 28 which has the same external configuration as the main body. The body cap has a stepped cylindrical bore 30 that includes a first section 32 that receives the projection 14, a second section 34 of a smaller diameter than that of section 32, and a third section 36 of a diameter smaller than that of section 34. An O-ring seal 38 provided in an annular recess 40 in the projection 14 effects a seal between the main body and the body cap. A radially directed inlet port or bore 42 extending through the body cap communicates the bore 30, at section 32, with a source (not shown) of liquid such as water.

It will be noted that the bore section 32 and the frustoconical end 16 of the projection 14 define a first annular chamber 44, which chamber contains the outlet of the bore 42. The sloping forward end transitional wall 46 of the chamber 44 defines with the end edge 48 of the projection 14 a first narrow liquid accelerating annulus or orifice 50 (see FIG. 3) which opens into a 2-phase conditioning or second annular chamber 52. The chamber 44 serves to evenly distribute the liquid into the orifice 50 for even flow to the chamber 52.

A flow throttle pin 54 resides in the bore 18 of diameter head 56 at the proximal end thereof, which head is press fit so as to be in the largest diameter proximal end section 22 of the bore 18 The pin 54 has a reduced diameter shaft section 58 which extends forwardly, the outer surface of the shaft section defining with the inner surface of the central bore section 20 a first annular gap or passage 60 into which the air is directed via the inlet port 26. In order to ensure that the pin 54 is fixed in place within the bore 18 so that there will be no off-axis movement at the distal end thereof there is provided a support member 62 intermediate the length of the shaft section, having longitudinally extending grooves 64 therethrough to permit air flow therepast. The support member is in the shape of a spider, with the grooves 64 located between radial arms 66. The outer edges of the support member arms 66 have a sliding fit with the interior wall of the bore 18.

The shaft section 58 of the pin extends forwardly to the end of the projection 14 and defines with the inner surface of the reduced diameter distal bore section 54 a very narrow first annular air flow orifice 68. Air enters the gap or passage 60 via the inlet port 26 and flows forwardly therethrough, past the support member 62 and then through the orifice 68 into the second or mixing chamber 52 where it aggressively mixes with the liquid that was introduced via the inlet port 42 and entered the chamber 52 via orifice 50.

A distal projection or extension 70 on the pin 54 passes through the mixing chamber 52, meaning that that chamber actually has a generally annular configuration defined between the inner surface of the bore section 34 and the outer surface of the extension 70. The extension 70 has a diameter smaller than that of the shaft section 58 and passes through the smallest diameter portion 36 of the bore 30 at the end of the body cap 28, defining with the inner surface of that bore section a third annular $1^{st}$ stage or primary atomization orifice 72. Liquid and air that is aggressively mixed in the mixing chamber 52 is evenly distributed from that chamber into the orifice 72, in which the liquid is formed into tiny ligaments dispersed within the flowing air. Those ligaments are projected outwardly from the end of the body cap as a spray of atomized droplets.

An optional and desirable addition to the structure of this nozzle is a $2^{nd}$ or secondary stage atomization zone 74 defined in part by the end face of the extension 70, a small diameter button pin 76 extending forwardly from that face, and a small diameter deflector plate or button 78 at the distal end of the pin 76. The deflector plate serves to further disperse the spray exiting the nozzle and also acts as a shield to prevent the spray from collecting on the nozzle components at the distal end thereof. The flow dynamics of the spray exiting the nozzle are such that there will be a build-up of turbulent air between the button pin 76 and the inner face 80 of the button pin 78. That turbulent flow tends to impart a radial component to the exiting flow, causing it to deflect outwardly at a greater conical angle, of 90 degrees or more, than the conical spray angle would be without the button plate in place, usually less than 90 degrees. Because of the flow dynamics created by the button plate there will be very little impingement of water droplets on the button plate, and furthermore there will be a reduced tendency of water droplets to form at the end face of the nozzle.

A further feature of the invention is the frustoconical or sculpted end face 82 of the body cap 28 which helps to control the spray flow as it exits the nozzle. As seen in the drawing the spray 84 is generally conical, its size and shape being controlled by the sizing of the nozzle components. Since the nozzle of this invention is typically used in HVAC ductwork, along which air will be flowing, such flowing air will follow the frustoconical end surface 82 to meet the spray exiting the nozzle, creating a back-swirling effect at the atomization zone 74 and causing the spray to dissipate more quickly into the ambient atmosphere at a still greater conical angle.

The size of the components used in the invention and the flow rates provided or achieved will of course determine the physical properties of the resulting spray. For example, the resulting spray will be influenced by: the velocity of the liquid flowing from the inlet 42 to the chamber 44 and through the acceleration annulus; the air velocity through the second annular orifice 48; the length and volume of the second annular mixing chamber 52; the dimensions of the $1^{st}$ stage atomization orifice 72; and the geometry of the $2^{nd}$ stage atomization zone 74. The orifice 48 is preferably designed so that the air velocity therethrough is critical at the operating pressure of the nozzle. The $1^{st}$ stage atomization orifice 72 is preferably designed for choked flow conditions.

The basic arrangement for use in duct humidification application involves an array of nozzles installed on boom assemblies 86 with associated feed manifolds 88, 88' to distribute and supply each nozzle with air and water. The typical installation for nozzles in accordance with this invention is for water flow up to 200 mL/min with a mass ratio of air-to-liquid of 0.45–0.50 (i.e., 2.5 scfm air flowrate). For this operating target condition there can be a liquid-flow turndown up to 3 or an operating range from 70 mL/min up to 200 mL/min. The nozzle design is scalable to larger or smaller operating ranges through careful design modification of the components used to create the flow through channels and external paths.

The geometry of the "button" or deflector plate 78 is selected: (a),to avoid wetting of the pin holding the button in place; and (b) to provide a cavity between the primary atomization orifice 72 and the "button" itself, thereby creating a length for the spray to establish and disperse in the vicinity of the button face for secondary atomization. The size, shape and position of the "button" relative to the geometry of the primary atomization orifice can be varied to accommodate the requirements of droplet size and spray shape for the particular application (i.e., droplet size can be made finer or coarser by varying the button geometry).

In order to ensure that the button or deflector plate will achieve the desired level of secondary atomization without accumulation of liquid on the structure thereof the plate 78 should have a desired geometry that will control the hydrodynamic and aerodynamic nature of the spray impinging thereon. The key geometric dimensions are illustrated in FIG. 2 which shows the nozzle tip on an enlarged scale. The preferred interrelated geometries of the nozzle elements are summarized in Table 1 below.

TABLE 1

| Ratio or Parameter | Typical Range | Preferred |
| --- | --- | --- |
| B/A | 1.3–1.5 | 1.4 |
| A/C | >2 | 2.25 |
| L/B | 0.25–0.4 | 0.34 |
| T/L | <2 | 1.01 |
| β | >35 degrees | 37 degrees |
| D/A | 1.5–2 | 1.6 |
| D/B | 1.0–1.3 | 1.15 |

The dimensions presented in FIG. 2 and referenced in Table 1 are set forth as follows:
A—inside radius of annular exit for primary atomization
A'—outside radius of annular exit for primary atomization
B—radius of "button"
C—radius of post that supports "button"
D—radius of transition to frustoconical face
T—thickness of "button"
L—distance between nozzle primary atomization exit
β—angle of frustoconical face The atomizer as shown can be used with or without a "button" component depending on the requirements for end use. Typically the button is used in applications where the spray is to be mixed quickly and in a small volume of space near the nozzle exit; if the spray is to be displaced to some location far away from the nozzle tip, the button may be removed to improve projection of the spray but a slightly coarser spray will result. Compensation to maintain droplet size when the button is removed can be achieved by modifying the air-to-liquid feed ratio for the nozzle with change to the flow rates as outlined for the critical geometric dimension ratio provided above. In general, droplet size is determined by the geometry of nozzle components 44, 48, 52 and 72 to establish sonic flow conditions for the spray at the exit of orifice 72. The addition of the button therefore serves not only as a secondary atomization component of the nozzle but also as a deflector that can be positioned in the spray to control or limit spray dispersion.

Figure 3:
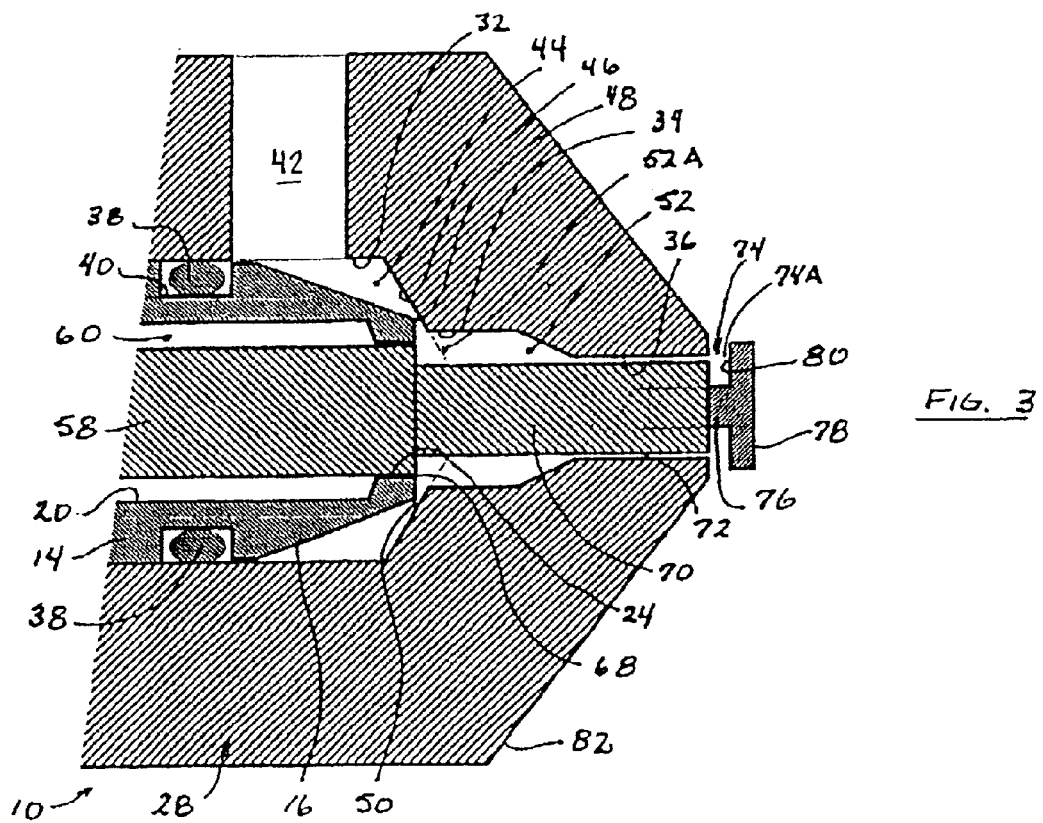
FIG. 3 is an enlarged cross-sectional view illustrating the flow paths for introducing, mixing and shearing liquid for atomization.
Figure 5:
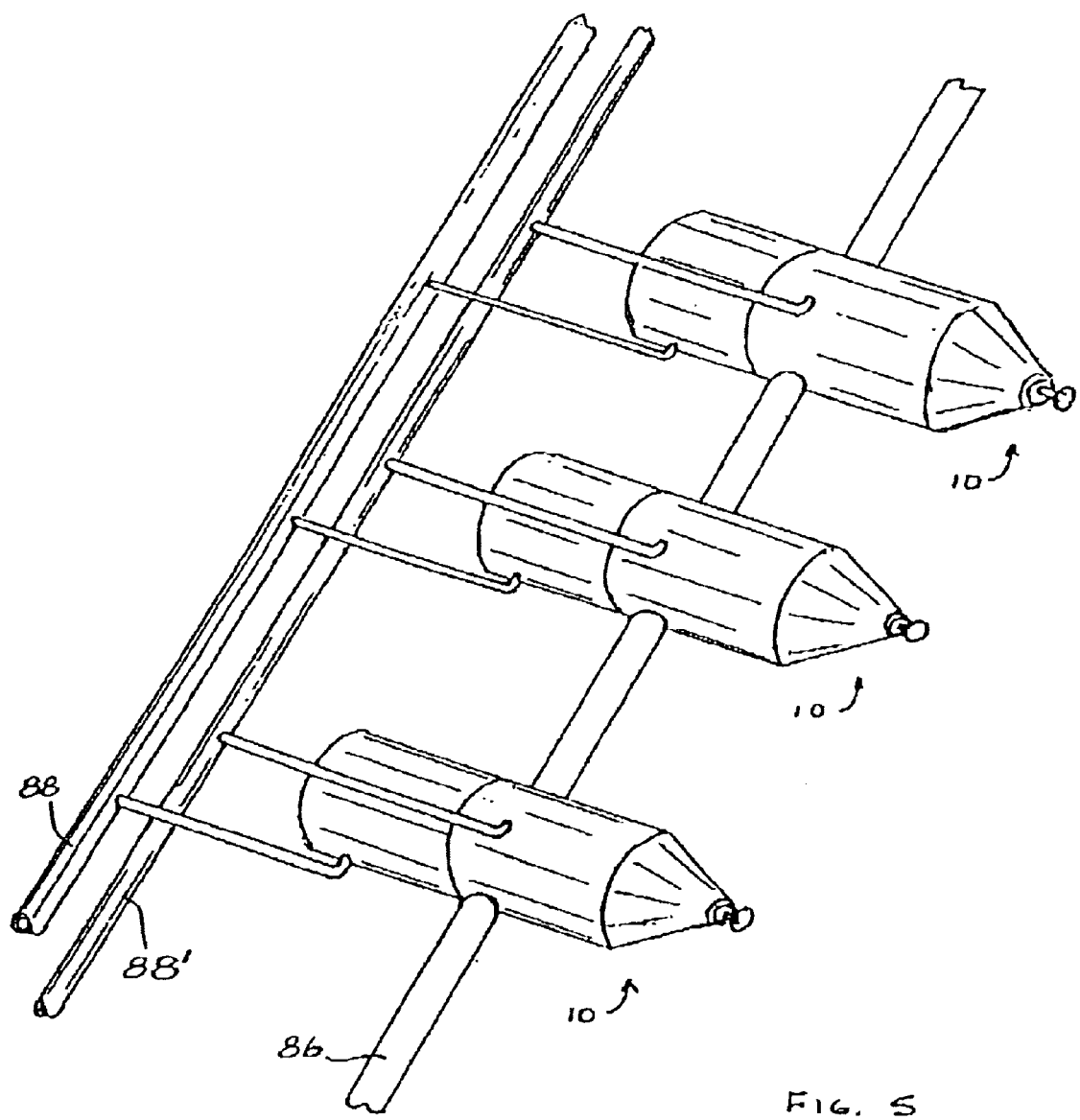
FIG. 5 illustrates the use of nozzles according to the invention in a typical HVAC duct.

FIG. 3 illustrates the nozzle tip in an enlarged view, indicating the flow channels used for introducing, mixing and shearing the liquid for optimum atomization. The flow through from feed to final stage of atomization and the associated criteria for design are as follows in Table 2 and with reference to the elements as defined in FIG. 3:

TABLE 2

Description and criteria for design of flow channels of nozzle

| Location or Flow Channel | Description | Criteria Range (typical operation) | Preferred |
| --- | --- | --- | --- |
| [44] | Annular inlet chamber for distribution of water feed chamber must be large enough to distribute liquid to annular entrance to second chamber [52A] | sized for axial velocity less than 1 m/s | empirical design |
| [48] | Annular orifice for liquid flow to accelerate liquid into the gas flow entering through orifice [68] | liquid velocity criterion: $U_{liquid} = 0.3–0.7$ m/s | 0.65 m/s |
| [68] | Annular entrance for air flow metered through the annulus (i.e. air flow is limited to choked flow when liquid feed is shut off) | gas velocity as criterion: $U_{air} = 0.5$ to $1.0$ mach | 0.6 mach |
| [52A] | Entrance and annular flow channel for mixing of gas and liquid streams to produce a fine bubbly 2-phase mixture good contacting and relatively high-shear 2-phase flow is developed to promote small bubble formation and dispersion in the liquid flow | geometry depends on gas-to-liquid ratio used design for a differential superficial velocity (slip velocity) between air and water of at least 6 m/s and as high as 25 m/s; superficial liquid velocity estimated to be 0.3 m/s and superficial gas of about 21 m/s | residence time of at least 25 ms slip velocity at the between liquid and gas of at least 20 m/s for fine spray application |
| [52] | Chamber for accelerating the 2-phase flow (finely dispersed bubbles in the liquid stream) into the primary atomization orifice [52] is configured to provide choked flow conditions (i.e., flow limited by sonic conditions) for the 2-phase mixture | channel has hydrodynamic shape to promote gradual transition to flow from [9a] through to [10] | |
| [72] | Primary atomization orifice flow accelerates through [72] under choked flow conditions to shear the liquid and provide intense mixing with the gas phase bubbles | geometry configured empirically for choked flow based on maximum throughput criteria for gas and liquid streams feed pressure and desired droplet size criteria are used to empirically determine the appropriate dimensions of this channel | residence time of liquid to be 3 ms or more (based on estimated superficial velocity) |
| [74] | geometry and criteria defined above for "button" configuration as in FIG. 2 the 2-phase mixture exits the nozzle orifice [72] and liquid is | atmospheric or near-atmospheric conditions design criteria is for geometry that provides impingement of spray without accumulation on the "button" or its | |

TABLE 2-continued

Description and criteria for design of flow channels of nozzle

| Location or Flow Channel | Description | Criteria Range (typical operation) | Preferred |
|---|---|---|---|
| | promptly atomized due to the sudden pressure reduction to near-atmospheric conditions | supporting post | |
| [74A] | geometry and criteria defined above for "button" configuration as in FIG. 2 shape of spray plume is relatively maintained over the entire operating range due to configuration of the "button" with spray impinging on the outer edge to perform secondary atomization | atmospheric or near-atmospheric conditions | |

The preferred button 78 is that shown in FIGS. 1, 2 and 3, being in the form of a circular plate with a diameter slightly greater than that of the distal end of the throttle pin extension 70. Alternative "buttons" that were evaluated and found to provide varying degrees of atomization and produce a range of spray shapes are shown in FIGS. 4A to 4D. The button of FIG. 4A is generally in the form of a cylindrical rod 90 having a concave inner end surface 92 and a convex or rounded outer end surface 94. The button of FIG. 4B is in the form of a cylindrical rod 96 having chamfered end edges 98, 98. The button of FIG. 4C is in the form of a cylindrical rod 100 having a small diameter concave inner end surface portion 102 and a flat outer end surface 104 with chamfered end edges 106. The button of FIG. 4D is in the form of a cylindrical rod 108 having a tapered or chamfered inner end surface 110 leading to an inwardly tapered or chamfered inner surface 112 and a rounded outer end surface 114. Shapes shown as example, but not limited the ones shown, were tested.

These shapes functioned satisfactorily but were not the preferred "button" described as the preferred embodiment. The "button" of the preferred embodiment was easy to manufacture and install in the atomizer assembly. Dimensions of the "button" prescribed both the final droplet size distribution and general shape of spray. The preferred shape of spray was a hollow cone. Mean size of the spray was less than 50 $\mu$m for effective evaporation rates in humidification applications.

What is claimed is:

1. A nozzle for mixing a gaseous fluid and a liquid and for ejecting an atomized mist of liquid droplets comprising: a nozzle body defining a first annular gap, a first annular chamber and a second annular chamber along the length thereof; means for introducing pressurized gaseous fluid into said first annular gap; means defining a first restricted annular orifice leading from said first annular gap to said second annular chamber; means for introducing pressurized liquid into said first annular chamber; a second restricted annular orifice leading from said first annular chamber to said second annular chamber, whereby liquid and gaseous fluid are aggressively mixed in said second annular chamber; and a third restricted annular orifice leading from said second annular chamber to atmosphere; wherein: said nozzle body includes a main body portion, a body cap portion, and a throttle pin member extending through said body on a longitudinal axis thereof; said first annular gap is defined between an outer surface of said throttle pin member and an inner surface of an axial bore within said main body portion; said first annular chamber is defined between a distal frustoconical surface of said main body portion and an inner surface of a central axial bore section within said body cap portion; and said annular chamber is defined between an outer surface of a reduced diameter portion of said throttle pin member and an inner surface of a reduced diameter axial bore section of said body cap portion, whereby mixed liquid and gaseous fluid are forcibly ejected from said nozzle through said third restricted annular orifice, the liquid being atomized in small controlled droplets in the ejected gaseous fluid.

2. The nozzle of claim 1 wherein: said first restricted annular orifice is defined between a reduced diameter section of said main body portion axial bore and said outer surface of said throttle pin; said second restricted annular orifice is defined between a distal edge of said frustoconical surface and a frustoconical transition surface leading from said body cap portion central axial bore section to said body cap portion reduced diameter axial bore section; and said third restricted annular orifice is defined between a further reduced diameter distal axial bore section of said body cap portion and a distal section of said reduced diameter portion of said throttle pin member.

3. The nozzle of claim 2 wherein said throttle pin member includes an enlarged diameter proximal end portion having a tight fit in an enlarged diameter proximal end section of said main body portion axial bore, and support means positioned intermediate the length of said throttle pin for supporting said throttle pin within said main body portion axial bore.

4. The nozzle of claim 3 wherein said main body portion includes a distal reduced diameter projection located within said body cap portion axial bore, said distal frustoconical surface being located at the distal end of said projection, said projection including an annular recess in a cylindrical outer surface thereof and a resilient o-ring member contained within said recess for sealing engagement with said inner surface of said body cap portion central axial bore.

5. The nozzle of claim 2 wherein said body cap portion has a distal end section having a frustoconical surface, and a small diameter button pin extends forwardly from the distal end of said reduced diameter portion of said throttle pin member, said small diameter pin terminating at a transverse button plate member spaced from the distal end of said body cap portion.

6. The nozzle of claim 5 wherein said frustoconical surface of said body cap portion is adapted to direct air flowing therepast towards a zone defined between said button pin and said button plate member such that said droplet-containing flowing gaseous fluid, after leaving said third annular orifice, is further redirected outwardly from said nozzle.

7. A nozzle for mixing a gaseous fluid and a liquid and for ejecting an atomized mist of liquid droplets comprising:

a nozzle body having a cylindrical bore extending axially therealong, said bore including a main central section of a first diameter, a proximal section of a second, greater diameter at an entrance to said bore, and a distal section of a third, smaller diameter at an exit from said bore, said distal section and a portion of said central section residing within a reduced outer diameter projection of said nozzle body, said projection having a frustoconical outer surface at a distal end thereof;

a throttle pin, said pin including a first section press fit in said proximal section of said bore, a shaft section within said central bore section defining a first annular gap extending therealong between an outer surface thereof and an inner surface of said central bore section and defining a first annular orifice between said outer surface at a distal end of said shaft section and said distal section of said cylindrical bore, means intermediate the length of said shaft section for supporting said shaft section within said central bore, and a cylindrical extension projecting from the distal end of said shaft section, of a diameter smaller than that of said shaft section;

first inlet means in said nozzle body communicating with said first annular gap for introducing gaseous fluid under pressure into said first annular gap;

a body cap matingly engageable with said nozzle body at a distal end thereof, said body cap having a cylindrical bore extending axially therealong, said body cap bore including a first section sealingly receiving said nozzle body projection therein and defining a first annular chamber between an inner surface thereof and the frustoconical outer surface of said nozzle body projection; a second section of diameter smaller than that of said body cap first bore section, defining a second annular chamber between an inner surface thereof and an outer surface of said throttle pin extension; and a third section of diameter smaller than that of said body cap second bore section and defining a third annular orifice between an inner surface thereof and the outer surface of said throttle pin extension at a distal end thereof, said third annular orifice leading from said second annular chamber to atmosphere at the distal end of said body cap;

a second annular orifice defined between the annular distal end edge of said nozzle body projection and a frustoconical transition surface between said first and second bore sections, of said body cap, said second annular orifice leading from said first annular chamber to said second annular chamber; and second inlet means in said body cap communicating with said first annular chamber for introducing liquid into said first annular chamber;

whereby: gaseous fluid under pressure is introduced via said first inlet means into said first annular gap and flows therealong, accelerating through said first annular orifice into said second annular chamber; liquid under pressure is introduced via said second inlet means into said first annular chamber, accelerates through said second annular orifice into said second annular chamber and aggressively mixes with the gaseous fluid entering said second annular chamber; and the mixed liquid and gaseous fluid accelerate through said third annular orifice from said second annular chamber to exit from said third annular orifice as fine, uniform atomized droplets of fluid mixed in the flowing gaseous fluid.

8. The nozzle of claim 7 in which said nozzle body projection has an annular recess in the outer surface thereof and a resilient o-ring seal member in said recess, said seal member sealingly engaging said inner surface of said body cap bore first section.

9. The nozzle of claim 8 wherein said distal end of said body cap has a frustoconically shaped end surface defining an angle β with a transverse plane at said distal end of said body cap, and a button pin extends axially from the distal end of said throttle pin extension and terminates at a transverse button member spaced from the distal end of said extension.

10. The nozzle of claim 9 wherein said droplet-containing flowing gaseous fluid, after leaving said third orifice, is redirected angularly outwardly by said button plate member and by air flowing over said body cap frustoconical surface.

11. The nozzle of claim 10 wherein said button member is in the form of a circular plate of a diameter slightly greater than that of the distal end of said throttle pin extension.

12. The nozzle of claim 10 wherein said button member is in the form of a cylindrical rod of a diameter greater than that of said button pin, said rod having chamfered end edges.

13. The nozzle of claim 10 wherein said button member is in the form of cylindrical rod of a diameter greater than that of said button pin, said rod having a concave inner end surface and a rounded outer end surface.

14. The nozzle of claim 10 wherein said button member is in the form of cylindrical rod of a diameter greater than that of said button pin, said rod having a small diameter concave inner end surface portion and a flat outer end surface with a chamfered outer edge.

15. The nozzle of claim 10 wherein said button member is in the form of cylindrical rod of a diameter greater than that of said button pin, said rod having an inner end surface with a chamfered outer edge leading to an inwardly tapered inner surface, and a rounded outer end surface.

16. The nozzle of claim 10 wherein said button pin has a diameter C, said throttle pin extension has a diameter A, said body cap bore third section has a diameter A', said button member has a diameter B, the end face of said body cap has a diameter D, said button member is spaced from said body cap end face by a distance L, and said button member has a thickness T, such that:

the ratio B/A is in the range of 1.3 to 1.5;
the ratio A/C is greater than 2;
the ratio L/B is in the range of 0.25 to 0.4;
the ratio T/L is less than 2;
the angle β is greater than 35 degrees;
the ratio D/A is in the range of 1.5 to 2; and
the ratio D/B is in the range of 1.0 to 1.3.

17. The nozzle of claim 16 wherein:

the ratio B/A is 1.4;
the ratio A/C is 2.25;
the ratio L/B is 0.34;
the ratio T/L is 1.01;
the angle β is 37 degrees;
the ratio D/A is 1.6; and
the ratio D/B is 1.15.

18. The nozzle of claim 7 wherein said frustoconical transition surface has an included angle which is greater than the included angle of said frustoconical outer surface at the distal end of said nozzle body projection.

19. The nozzle of claim 18 wherein said frustoconical transition surface passes said annular distal end edge of said nozzle body projection.

20. The nozzle of claim 19 including a frustoconical transition surface extending from said body cap bore second section to said body cap bore third section.

21. The nozzle of claim 16 wherein said body cap end face is in a plane containing the distal end face of said throttle pin extension.

22. The nozzle of claim 16 wherein said body cap end face is in a plane that is axially staggered with respect to a plane containing the distal end face of said throttle pin extension.

23. Humidification arrangement for use in an elongated air duct comprising:

a first source of pressurized fluid;

a second source of liquid;

first distribution means connected to said first source of gaseous fluid;

second distribution means connected to said second source of liquid;

a plurality of nozzles as defined in claim 1 arrayed within said duct for spraying droplets of liquid in a uniform pattern across said duct;

support means within said duct for mounting said plurality of nozzles therein;

first means connecting said first distribution means to said means for introducing pressurized gaseous fluid of each said nozzle;

second means connecting said second distribution means to said means for introducing liquid of each said nozzle; and means for flowing air within said duct, past said plurality of nozzles, whereby said droplets of atomized liquid are sprayed uniformly into said flowing air.

24. The arrangement of claim 23 characterized in that said liquid is water provided at a flow rate of 70 mL/min to 200 mL/min and said gaseous fluid is air, such that the mass ratio of air-to-water is in the range of 0.45 to 0.50.

* * * * *